(12) United States Patent
Santoni (10) Patent No.: US 11,673,299 B2
(45) Date of Patent: Jun. 13, 2023

(54) FIBRE FLATTENING

(71) Applicant: McLaren Automotive Limited, Woking (GB)

(72) Inventor: Claudio Santoni, Woking (GB)

(73) Assignee: McLaren Automotive Limited, Woking (GB)

( * ) Notice: Subject to any disclaimer, the term of this patent is extended or adjusted under 35 U.S.C. 154(b) by 334 days.

(21) Appl. No.: 17/042,701

(22) PCT Filed: Mar. 26, 2019

(86) PCT No.: PCT/GB2019/050855
§ 371 (c)(1),
(2) Date: Sep. 28, 2020

(87) PCT Pub. No.: WO2019/186137
PCT Pub. Date: Oct. 3, 2019

(65) Prior Publication Data
US 2021/0138698 A1    May 13, 2021

(30) Foreign Application Priority Data

Mar. 29, 2018  (GB) ...................... 1805232

(51) Int. Cl.
*B29C 70/56*   (2006.01)
*B29C 70/54*   (2006.01)
(Continued)

(52) U.S. Cl.
CPC .......... *B29C 43/3642* (2013.01); *B29C 51/28* (2013.01); *B29C 70/542* (2013.01);
(Continued)

(58) Field of Classification Search
CPC ... B29C 43/3642; B29C 51/28; B29C 70/542; B29C 70/56; B29C 2043/3644; B29C 2043/3647; B29C 2043/3655
See application file for complete search history.

(56) References Cited

U.S. PATENT DOCUMENTS

2005/0153098 A1* 7/2005 Bhatnagar ............... B32B 27/36
428/113
2010/0269978 A1* 10/2010 Marengo ............. B29C 67/0037
156/212
(Continued)

FOREIGN PATENT DOCUMENTS

DE   20 2016 10449    8/2016
EP   0393767          10/1990
(Continued)

OTHER PUBLICATIONS

Notification of Transmittal of the International Search Report and the Written Opinion of the International Searching Authority, or the Declaration, issued in corresponding International Application No. PCT/GB2019/050855, dated Sep. 3, 2019, 20 pages.
(Continued)

*Primary Examiner* — Matthew J Daniels
(74) *Attorney, Agent, or Firm* — Fish & Richardson P.C.

(57) ABSTRACT

A method of forming a fibre article, comprising: providing a former having a contoured forming surface; locating a fibre preform between a first diaphragm and a second diaphragm, the second diaphragm being offset from the forming surface; drawing a vacuum between the first and second diaphragms so as to hold the preform captive between the diaphragms; displacing the second diaphragm towards the former so as to bring the second diaphragm into partial contact with the former; drawing a vacuum between the second diaphragm and the former so as to bring at least a part of the second diaphragm adjoining the preform into
(Continued)

conformity with the forming surface; and setting the preform in its configuration; wherein: the fibre preform comprises one or more substantially inextensible fibres extending linearly in a first direction; the forming surface comprises a concavity and prominences on either side of the concavity; and the step of bringing the second diaphragm into partial contact with the former comprises bringing the second diaphragm into contact with the prominences whilst the second diaphragm does not fully contact the concavity and with the substantially inextensible fibres extending from one of the prominences to the other.

11 Claims, 6 Drawing Sheets

(51) Int. Cl.
*B29C 43/36* (2006.01)
*B29C 51/28* (2006.01)
(52) U.S. Cl.
CPC ...... *B29C 70/56* (2013.01); *B29C 2043/3644* (2013.01); *B29C 2043/3647* (2013.01); *B29C 2043/3655* (2013.01)

(56) References Cited

U.S. PATENT DOCUMENTS

| 2012/0174748 A1* | 7/2012 | Landi ...................... F41H 1/02 89/922 |
| 2015/0217529 A1 | 8/2015 | Nagasaka et al. |
| 2015/0328843 A1 | 11/2015 | Karb et al. |

FOREIGN PATENT DOCUMENTS

| EP | 0410599 | 1/1991 |
| GB | 2452298 | 3/2009 |
| WO | WO 02/02299 | 1/2002 |
| WO | WO 2007/043876 | 4/2007 |
| WO | WO 2009/044194 | 4/2009 |

OTHER PUBLICATIONS

Search Report under Section 17(5) issued in related Application No. GB1805232.4 dated Sep. 18, 2018, 4 pages.
Search Report under Section 17(6) issued in related Application No. GB1805232.4 dated Jun. 12, 2019, 2 pages.
PCT International Preliminary Report on Patentability in International Appln. No. PCT/GB2019/050855, dated Sep. 29, 2020, 11 pages.

* cited by examiner

FIBRE FLATTENING

CROSS-REFERENCE TO RELATED APPLICATIONS

The present application is the national stage entry of International Patent Application No. PCT/GB2019/050855, filed on Mar. 26, 2019, and claims priority to Application NO. GB 1805232.4, filed in the United Kingdom on Mar. 29, 2018, the disclosures of which are expressly incorporated herein in its entirety by reference thereto.

This invention relates to the use of fibre reinforcement in diaphragm forming processes.

Figure 1A:
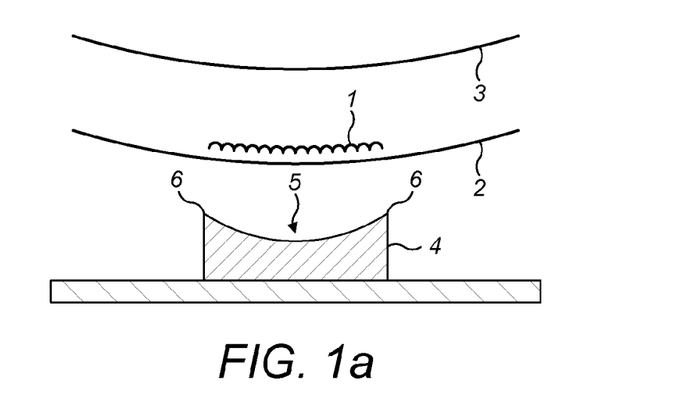
FIG. 1 shows stages in a diaphragm forming process.
Figure 1B:
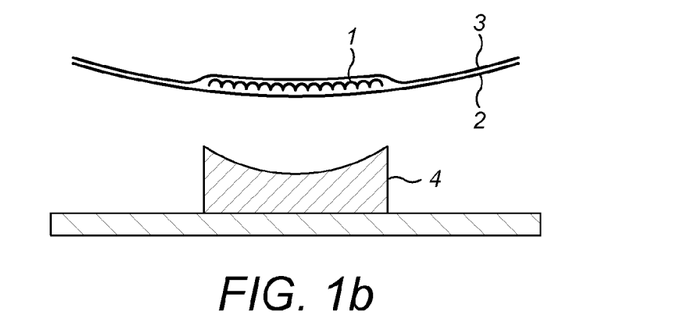
Figure 1C:
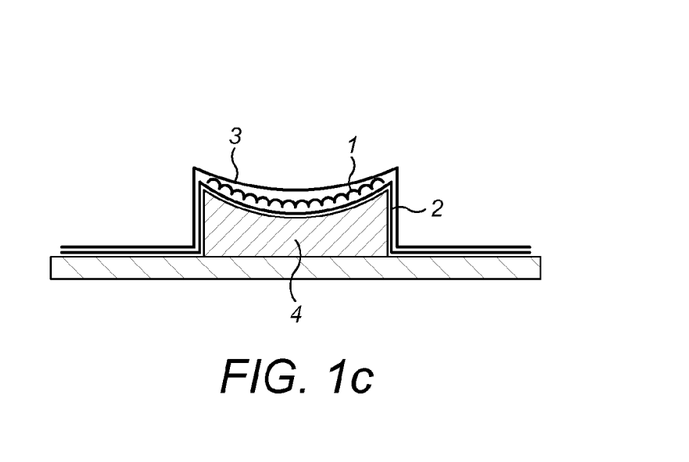

FIG. 1 shows steps in one type of diaphragm forming process. At FIG. 1a, a mat 1 of reinforcing fibres impregnated with a heat-activated adhesive is located between two diaphragms 2, 3. A shaped former 4 is located under the diaphragms. The mat 1 is positioned so that it is directly above the former. (See FIG. 1a). A vacuum is drawn between the diaphragms to consolidate the mat 1 and hold it tight between the diaphragms. (See FIG. 1b). Then a vacuum is drawn in the region between the lower diaphragm 3 and the former. This causes the diaphragms and hence the mat to conform to the former. (See FIG. 1c). The mat is heated to cause it to set in the shape of the former's surface. Then the vacuums can be released and the shaped mat removed. This process can be used to make fibre preforms for use in a subsequent resin transfer moulding step.

In practice, it can be difficult to make the mat conform smoothly to the surface of the former. Despite it being held firmly between the diaphragms, folds can be introduced into the mat as it is pressed against the former. This results in weaknesses and inconsistencies in the final product.

A particular problem arises in the situation shown in FIG. 1, when there is a hollow 5 in the former which is contacted by the lower diaphragm after it has contacted prominences 6 on either side of the hollow. In this situation, as the lower diaphragm makes contact with the prominences the mat can be pinned at the points where it overlies the prominences. If excess mat is in that way caught between the prominences, it may eventually manifest as a fold or a wrinkle in the mat when the diaphragms progressively make contact deeper into the hollow.

It would be desirable to have an improved method for having reinforcement material conform to a former.

According to one aspect there is provided a method of forming a fibre article, comprising: providing a former having a contoured forming surface; locating a fibre preform between a first diaphragm and a second diaphragm, the second diaphragm being offset from the forming surface; drawing a vacuum between the first and second diaphragms so as to hold the preform captive between the diaphragms; displacing the second diaphragm towards the former so as to bring the second diaphragm into partial contact with the former; drawing a vacuum between the second diaphragm and the former so as to bring at least a part of the second diaphragm adjoining the preform into conformity with the forming surface; and setting the preform in its configuration; wherein: the fibre preform comprises one or more substantially inextensible fibres extending linearly in a first direction; the forming surface comprises a concavity and prominences on either side of the concavity; and the step of bringing the second diaphragm into partial contact with the former comprises bringing the second diaphragm into contact with the prominences whilst the second diaphragm does not fully contact the concavity and with the substantially inextensible fibres extending from one of the prominences to the other.

According to a second aspect there is provided a method of forming an article, comprising: providing a former having a contoured forming surface; locating a preform between a first diaphragm and a second diaphragm; drawing a vacuum between the first and second diaphragms so as to hold the preform captive between the diaphragms; drawing a vacuum between the first diaphragm and the former so as to bring at least a part of the first diaphragm adjoining the preform into conformity with the forming surface; and setting the preform in its configuration; wherein the first diaphragm is thinner and/or more elastic than the second diaphragm.

According to a third aspect there is provided a double diaphragm forming apparatus comprising: a bed for receiving a contoured former; a first diaphragm and a second diaphragm, the first diaphragm being closer to the bed than the second diaphragm and the diaphragms being mounted so that (i) they can be brought together to define a first air-tight space therebetween and (ii) they can be brought towards the bed to define a second air-tight space between the first one of the diaphragms and the bed; and one or more pumps for drawing vacuums in the first and second air-tight spaces.

The first diaphragm may be thinner and/or more elastic and/or easier to deform and/or have a lower Young's modulus than the second diaphragm.

The fibre preform may comprise a first sheet of fibre material, the fibres of the first sheet being offset from the first direction by at least 30° and the said substantially inextensible fibres being laminated to the first sheet.

The fibre preform may comprise a second sheet of fibre material, the fibres of the second sheet being offset from the first direction by at least 30° and the said substantially inextensible fibres being laminated to the second sheet and being located between the first sheet and the second sheet.

The said substantially inextensible fibres may extend in the first direction beyond the boundary of the first sheet.

The said substantially inextensible fibres may extend in the first direction beyond the boundary of the second sheet.

The said inextensible fibres may be comprised in a sheet of fibre material.

The or each sheet of fibre material may be a sheet of woven fibre material.

The diaphragms may be elastic. They may be elastic sheets. They may be isotropically or anisotropically elastic in their planar directions.

The step of bringing the second diaphragm into partial contact with the former may comprise, after bringing the second diaphragm into contact with the prominences whilst the second diaphragm does not fully contact the concavity, stretching the diaphragm over the prominences so as to cause the substantially inextensible fibres to apply tension to a portion of the preform extending across the concavity.

The present invention will now be described by way of example with reference to the accompanying drawings. In the drawings.

Figure 2:
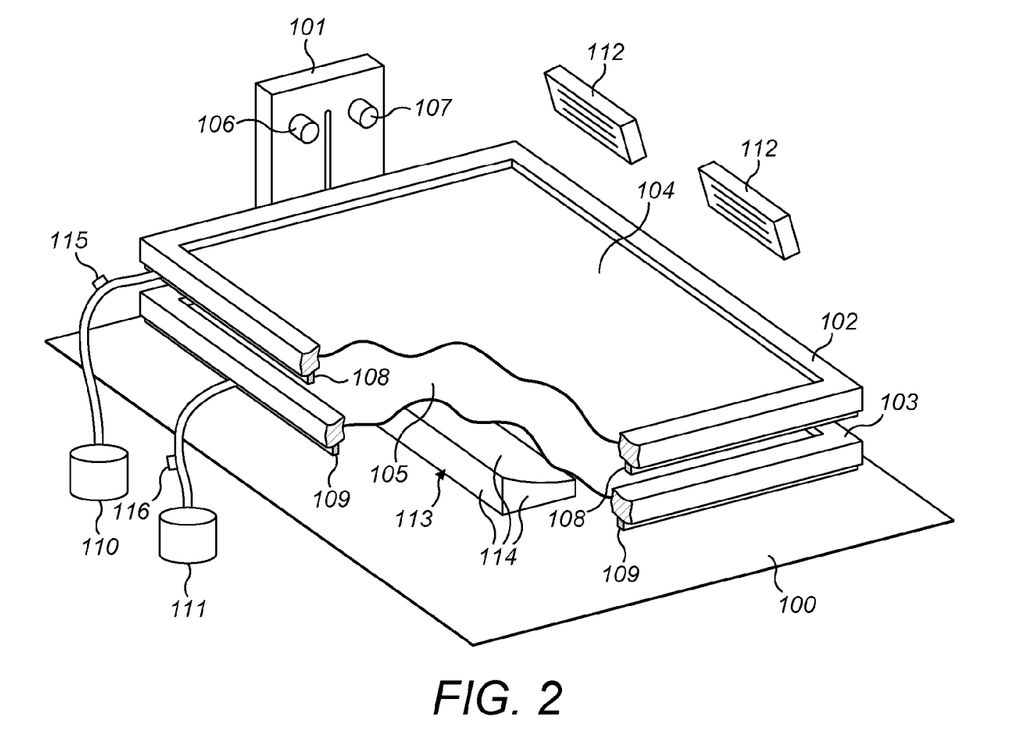
FIG. 2 shows a diaphragm forming apparatus.

FIG. 2 is a cut-away view of a diaphragm forming apparatus. The apparatus comprises a base 100. In this example the base is a horizontal generally flat surface, but it could be in any orientation and could be non-flat. A support tower 101 extends away from the base. FIG. 2 shows a single support tower but there could be multiple towers or support mechanisms of other forms as required for stability. The support tower 101 supports a pair of frames 102, 103. Each frame is a rigid structure defining an opening within it. The frames are generally planar and are arranged so that they are generally parallel to the base 100. Diaphragms 104, 105 are attached to respective ones of the frames so as to close the opening in the respective frame. Each diaphragm is attached in an air-tight way around its periphery to the respective frame. The diaphragms are formed of flexible and optionally elastic sheet material. The frames are mounted on the support tower 101 so that they can be moved towards and away from the base 100 by means of motors 106, 107. A seal 108 is provided on one or both of the frames so that when the frames are moved so as to abut each other the volume between the diaphragms can be sealed in an air-tight manner. A seal 109 is provided on frame 103 and/or on base 100 so that when frame 103 is moved so as to abut the base the volume between the base and the diaphragm 105 carried by frame 103 can be sealed in an air-tight manner. The seals could be located in any suitable way. A first vacuum pump 110 is coupled to one of the frames through an opening which, when the frames are abutting each other, gives access to the volume between the diaphragms. A second vacuum pump 111 is coupled to one of the frames or to the base through an opening which, when the frame 103 is abutting the base, gives access to the volume between diaphragm 105 and the base. Heaters 112 are arranged to play on the upper diaphragm. Heaters could be provided that can play on the lower diaphragm. They could be removable from the space between the closer diaphragm 105 to the base 100 and the base itself to permit the closer diaphragm to be moved to meet the base. A former 113 is located on the base.

The diaphragms are formed of a pliable sheet material. One or both of the diaphragms may be formed of an elastic material. The diaphragms may, for example, both be formed of elastomeric sheet, for example rubber or silicone sheet. The diaphragms may be of any suitable thickness, for example a thickness in the range from 0.5 to 2.0 mm. Each diaphragm may be held taut in its respective frame. Alternatively, each diaphragm may be held loosely in its frame. As a consequence it may sag somewhat at the outset of the forming process.

The base or bed 100 is generally flat. Optionally, grooves may be provided in the bed or scrim may be laid across the bed to improve the drawing of a vacuum uniformly across the bed and the former. Pump 111 could draw its vacuum through orifices in the bed.

In operation, a precursor, which may be a mat of reinforcing material impregnated with a heat activated adhesive, can be placed between the diaphragms. Then the diaphragms can be moved together by using motor 106 and/or motor 107 to reposition one or both of the frames. Then a vacuum is drawn between the diaphragms by using pump 110. Then the diaphragms can be moved in unison by using motors 106 and 107 so as to bring frame 103 into a position where it abuts the base 100. The vacuum between the frames is maintained. This pushes diaphragm 105 into partial conformity with the exposed surface 114 of the former 113. The precursor is located at a region of the diaphragms such that it too is forced to take up the shape of the former. Because the preform is held to diaphragm 105 by diaphragm 104, the preform is also partially conformed to the exposed surface 114. Then a vacuum is drawn between diaphragm 105 and the base 100. This brings diaphragm 105 into full conformity with the exposed surface 114. At some point up to this stage the precursor has been heated by heaters 112 in order to activate the adhesive. Then the adhesive is permitted to set, fixing the precursor in a shape mimicking that of at least part of the exposed surface 114 of the former. Then the vacuums are released by activating valves 115, 116 in the supply lines from pumps 110, 111, the frames are moved apart and the part formed from the precursor is removed.

Figure 3:
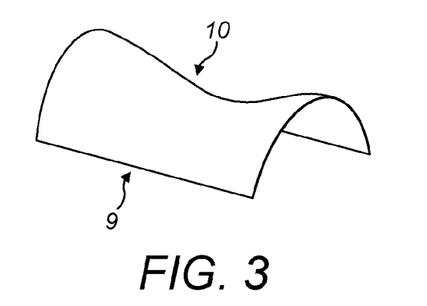
FIG. 3 shows a part to be formed.

FIG. 3 shows a part 9 that may be desired to be formed using this method. The part has a saddle region 10 which is concave upwards in the orientation of FIG. 3.

Figure 4:
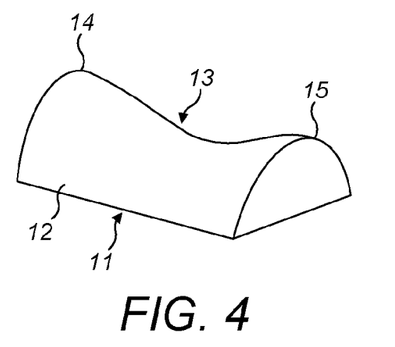
FIG. 4 shows a former for shaping the part of FIG. 3.

FIG. 4 shows a former or tool 11 suitable for forming the part of FIG. 3 in a diaphragm forming process. The former is a rigid block or shell having a forming surface 12. The forming surface has a shape that matches the desired shape of part 9. The forming surface has a saddle region 13 which is concave upwards in the orientation of FIG. 3 and is intended to shape the saddle region 10 of the part 9. On either side of the saddle region 13 of the former there are prominences 14, 15.

FIG. 5 shows stages in the forming of the part 9 by a double-diaphragm process, using the apparatus of FIG. 2.

In a first step (FIG. 5a) the two diaphragms 104, 105 are spaced apart from each other and from the former 113. Each diaphragm is suspended from a respective frame 102, 103. The operating direction 120 in which the frames can be moved is generally perpendicular to the diaphragms, and the former 113 is positioned on bed 100 offset from the diaphragms in the operating direction. The former is located on the bed with its forming surface 114 facing the closer diaphragm 105. The prominences 14, 15 are both nearer to the closer diaphragm than is the hollow defined by the saddle region 13.

Figure 5A:
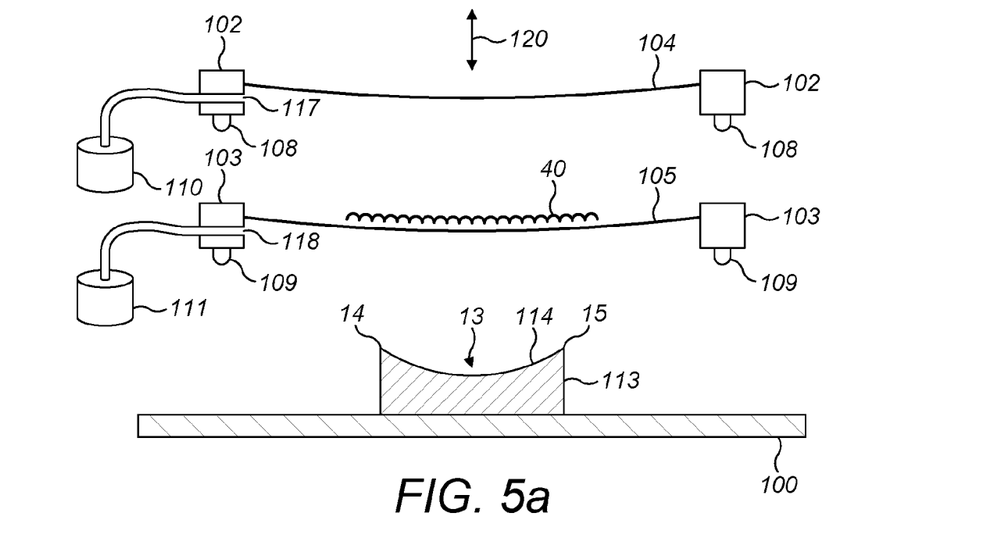
FIG. 5 shows, in cross-section, stages in a double-diaphragm process for shaping the part of FIG. 3.

As shown in FIG. 5a, a precursor 40 is located between the diaphragms. The precursor is formed of sheet material. It may comprise one or more layers of material. One or more such layers may, for example, be of woven or knitted fabric. One or more such layers may, for example, be of loose or bundled fibres, for example runs of fibre or tow. One or more such layers may, for example, be non-fibrous material, for example biaxially uniform sheet. A fabric layer may comprise runs of reinforcing fibre which are interwoven, stitched or fused together. Such stitching may be by means of a secondary fibre material having a lower tensile strength per unit volume than the material of the reinforcing fibre. The stitching fibre may nevertheless be substantially inextensible. The reinforcing fibre may, for example, be carbon fibre, glass fibre or a polymer fibre such as an aramid fibre. Layers of loose or bundled fibres may comprise fibres of one or more such materials. As an example, the precursor may comprise multiple sheets of carbon fibre fabric or mat. Each of those sheets may comprise carbon fibre runs in multiple non-parallel directions. For example, the runs in a single sheet may be offset at 90°, 60° or 45° to each other. The sheets may be arranged one on top of the other so that the run directions in one sheet are offset from the or each run direction in the or each adjacent sheet. When the precursor comprises multiple sheets they may be tacked together by adhesive or by mechanical bonding elements such as staples, studs, clips or stitches to help retain them in alignment with each other.

The precursor is pliable. This allows it to be forced to conform to the forming surface 114 of the former.

The precursor is configured so that it can be set in shape so as to adopt the shape of the forming surface. This may be done in any suitable way. For example, one or more layers of the precursor may comprise thermoplastic material. The precursor may then be heated (e.g. by heaters 112) before and/or whilst in contact with the former so as to raise the thermoplastic material above its softening temperature (e.g. for some materials the glass transition temperature), and then permitted to cool whilst in contact with the former so as to set the thermoplastic material in shape. Alternatively, one or more layers of the precursor may comprise a heat activated adhesive. The precursor may then be heated before and/or whilst in contact with the former so as to cause the adhesive to set the precursor in shape. Alternatively, one or more layers of the precursor may be of a plastically deformable material so that pulling the precursor against the former causes plastic deformation of the plastically deformable material. One convenient approach is for the precursor to comprise a layer of fabric comprising fibres, and for those fibres to be coated with a thermosetting adhesive.

The precursor is located between the diaphragms at a location such that, when the diaphragms are moved to the former as will be described below, it will be located at the shaping surface 114. Consequently it can be pressed to the shape of the shaping surface 114.

If the diaphragms are generally horizontal then the precursor can be laid on the lower diaphragm, as shown in FIG. 5*a*. The precursor may be tacked to one of the diaphragms with a temporary adhesive. That may help hold it in place if the diaphragms are not horizontal.

As indicated above, in one example of the process, the diaphragms and the precursor are heated at this stage, e.g. by heaters 112. There may be additional heaters (not shown in FIG. 5*a*) between the closer diaphragm 105 and the former 113. They can be removed before the next step of the process. Heating the precursor at this stage can soften it if it is thermoplastic or can activate a heat-activated adhesive comprised in the precursor.

There is an outlet 117 through frame 102. Pump 110 is coupled to that outlet. Seal 108 can render the region between the diaphragms air-tight when the frames are positioned against each other, except for outlet 117. The seal 108 may, for example, be a rubber bead. Pump 110 could alternatively (or in addition) be coupled through frame 103 and/or could be attached to a connector in one of the diaphragms.

Figure 5B:
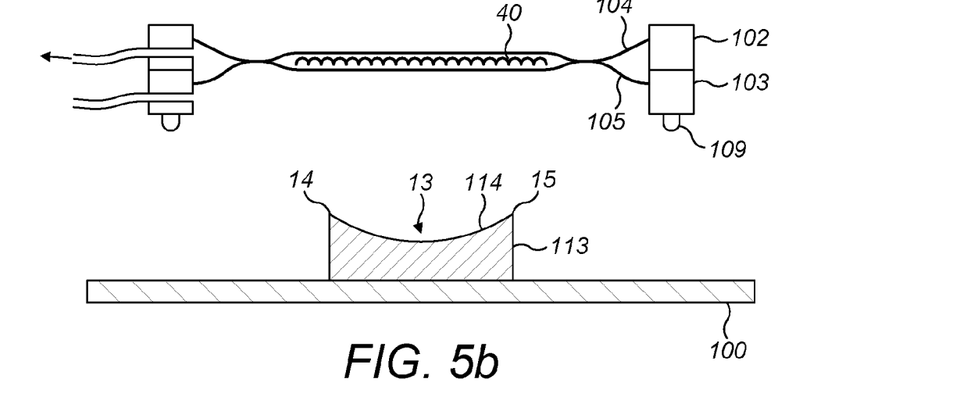

As shown in FIG. 5*b*, in the next step of the process the diaphragms 104, 105 are brought together by moving at least one of the frames so as to bring the frames into sealing engagement. Then a vacuum is drawn between the diaphragms by means of pump 110. This pulls the diaphragms together and holds the precursor securely captive between the diaphragms.

There is an outlet 118 through frame 103. Pump 111 is coupled to that outlet. Seal 109 can render the region between the closer diaphragm 105 and the bed 100 air-tight when the closer frame 103 is positioned against the bed, except for outlet 118. The seal 109 may, for example, be a rubber bead.

In the next step of the process the frames 102, 103 are moved so as to bring the closer diaphragm 105 into contact with the forming surface 114. The diaphragm first contacts the prominences 14, 15. (See FIG. 5*c*). Then, as shown in FIG. 5*d*, the frames are moved so that the closer frame 103 to the bed is brought into sealing engagement with the bed.

At this stage, although the periphery of the closer diaphragm 105 is closer to the bed in the operating direction 120 than is the deepest part of the saddle 13 of the forming surface 114, the closer diaphragm 105 is held away from the deepest part of the saddle by the prominences 14, 15.

Next, using pump 111 a vacuum is drawn between the bed 100 and the closer diaphragm 105. (FIG. 5*e*). This pulls the closer diaphragm 105 into conformant uniform contact with the forming surface 114. The precursor 40 has been positioned so that it is adjacent to the region of the closer diaphragm 105 that is in contact with the forming surface 114. Because the precursor is held to the closer diaphragm by the vacuum between the two diaphragms, the precursor is also held in conformity with the shape of the forming surface 114.

The precursor is then set in shape by appropriate means. For example, if the precursor is thermoplastic and has previously been heated then it is permitted to cool; or if the precursor comprises thermosetting adhesive then the precursor is heated (if not already heated); or if the precursor comprises ultra-violet activated adhesive then it is exposed to ultra-violet light. Once the precursor has been set in shape the vacuums are released, the frames returned to the position shown in FIG. 5*a* and the set body is removed from the apparatus as shown at 40' in FIG. 5*f*.

As indicated above, there is a risk that when the precursor is pressed against the prominences 14, 15 (see FIG. 5*c*/5*d*) it will be pinned against them with excess material between the prominences that results in folds or wrinkles when the precursor is fully pressed against the former (see FIG. 5*e*). Mechanisms to resist this effect will now be discussed.

Figure 6:
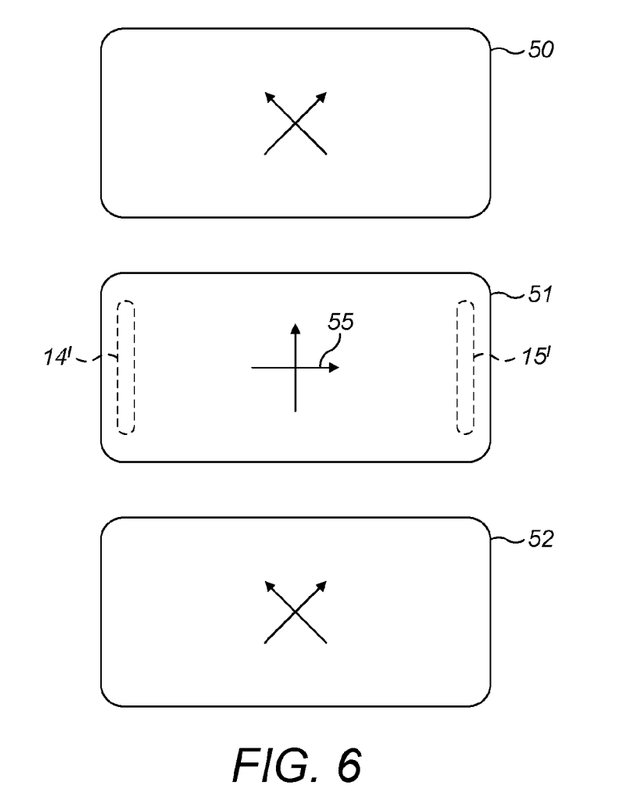
FIG. 6 shows a first set of layers for forming the part of FIG. 3.

FIG. 6 shows a set of sheets 50, 51, 52 which can be laminated together to form the precursor 40. Each sheet is formed of fibres some of which extend in one direction and some of which extend in another direction. The fibre directions are shown by arrows on each sheet. In practice, when the precursor is ultimately to provide strength in an intended product, the sheets should predominantly be laid up with the fibres in suitable directions to resist tensile loads in the intended product. In this example, sheets 50 and 52 serve that purpose. Those sheets form the outer layers of the precursor when sheets 50 to 52 are laminated together.

The precursor formed by the sheets of FIG. 6 is to be positioned so that when it is brought against the former the fibre direction 55 extends directly between the prominences 104. The intended positions of the prominences 14, 15 are shown superimposed on sheet 51 at 14' and 15' respectively. The effect of this is to make the precursor relatively inextensible in the direction directly between the prominences. If sheet 51 were absent, because the fibre directions of sheets 50 and 52 are substantially offset from the axis directly between the prominences it might be possible for those sheets to stretch and/or shear under tension in the direction directly between the prominences.

Figure 5C:
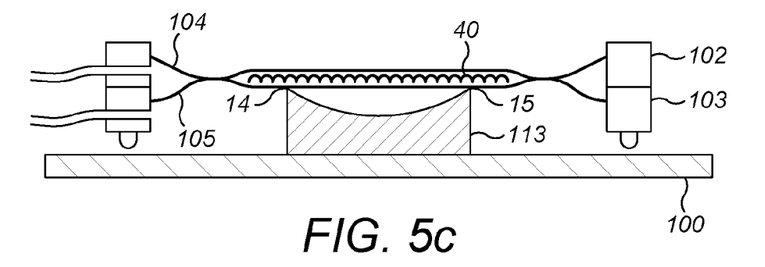
Figure 5D:
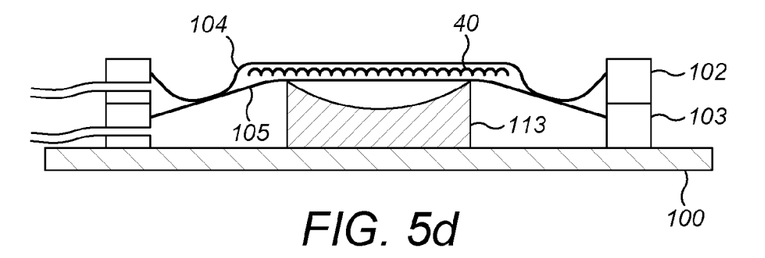
Figure 5E:
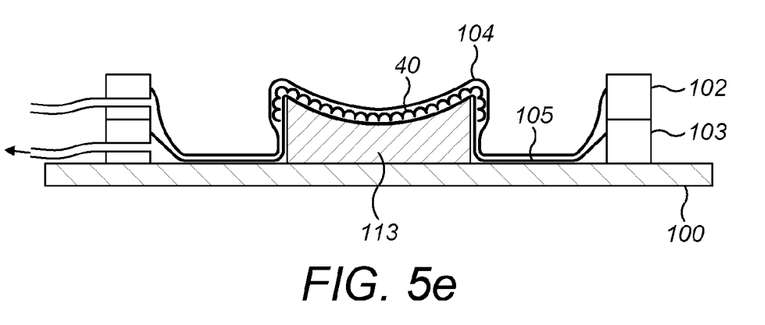
Figure 5F:
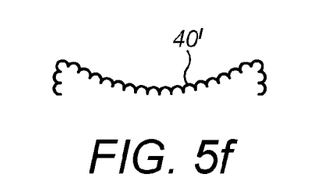

When the diaphragms are pulled over the former 113, for example in the transition from the state shown in FIG. 5*c* to the state shown in FIG. 5*d*, or at the outset of drawing the vacuum between the closer diaphragm 103 and the bed 100, they will tend to stretch over the prominences. At that stage the precursor is trapped between the diaphragms. If the precursor is relatively inextensible in the direction between the prominences, this stretching of the diaphragm can tend to pull the precursor taut between the prominences. This can help to reduce the amount of the precursor between the prominences, which can help to limit the formation of folds or wrinkles as the precursor is fully pressed into conformity with the former 113.

It would be possible for layers 50 and 52 to be omitted. Layer 51 could still pull taut between the prominences. However, layers 50 and 52 might be beneficial for the strength of the ultimate product. In the example illustrated in FIG. 6, layer 51 is an interior layer of the precursor, with layers 50 and 52 on either side of it. This can be beneficial because layer 51 can then draw both layers 50 and 52 taut through its contact with them. Alternatively, layer 51 could be located at the exterior of the preform.

The fibres whose directions are shown in FIG. 6 could be reinforcing fibres, for example carbon fibres. The fibres in multiple directions could be interconnected in any suitable way. For example they could be woven, stitched, knitted, welded or glued together. The fibres in direction 55 could be reinforcing, fibres of high tensile strength (e.g. having a Young's modulus greater than 100 GPa), or they could be fibres of lower tensile strength (e.g. having a Young's modulus less than 100 GPa). In the latter case, they could be stitching that holds other fibres of sheet 51 together.

Figure 7:
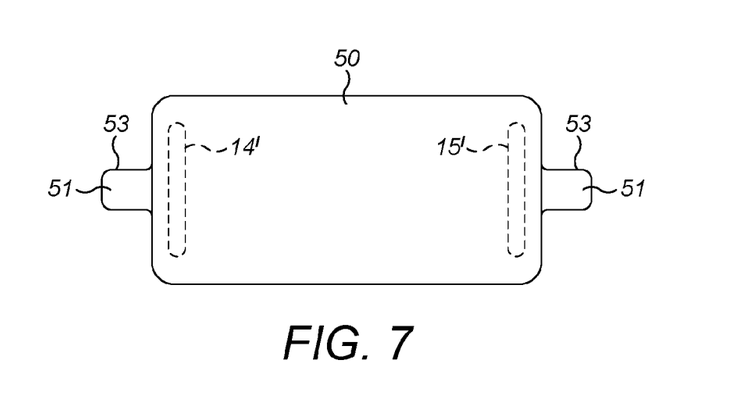
FIG. 7 shows a second set of layers for forming the part of FIG. 3.

FIG. 7 shows another way in which the precursor could be formed. In this example the precursor is formed of sheets with similar fibre orientations to those of FIG. 6. Sheet 51 is shaped so as to extend further than sheets 50 and 52 in the direction between the prominences 14, 15. (The intended positions of the prominences 14, 15 are shown superimposed at 14' and 15' respectively). The extended parts of sheet 51 are shown at 53. The extended parts extend further on the opposite side of the prominences from the hollow 13 than the other sheets of the precursor. This allows less material to be used in sheets 50 and 52 whilst still permitting sheet 51 to be subject to tension from the diaphragms in the manner described above.

Figure 8:
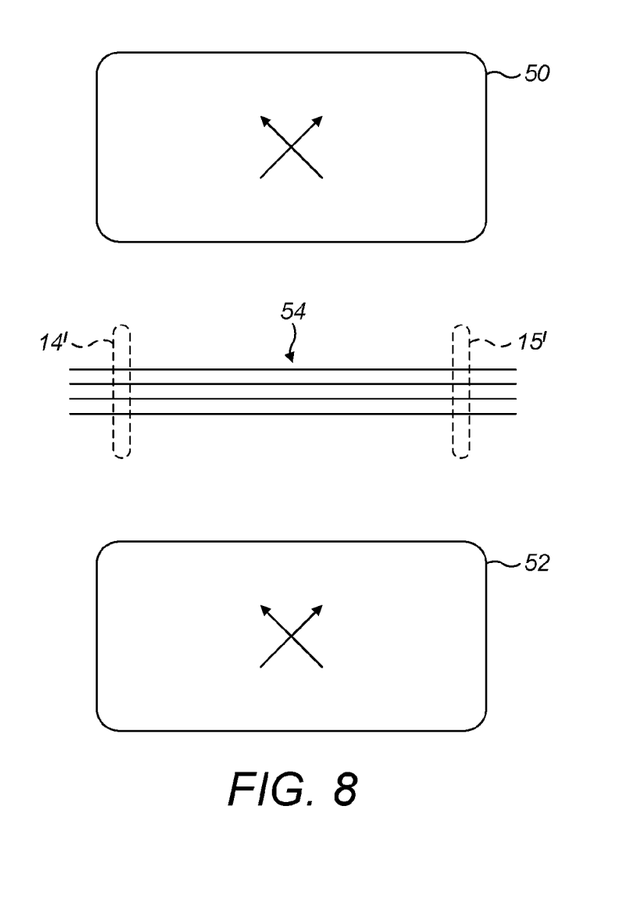
FIG. 8 shows a third set of layers for forming the part of FIG. 3.

FIG. 8 shows another way in which the preform can be constituted. Between layers 50 and 52 a set of separate individual fibres 54 are run between the intended locations 14', 15' of the prominences. The fibres 54 extend directly between the intended locations 14', 15' of the prominences. The fibres 54 could, for example, be tows of fibres of high tensile strength (e.g. having a Young's modulus greater than 100 GPa).

When the closer diaphragm 105 comes into contact with the prominences, at least some of the tensioning fibres (e.g. 54 or as at 55) preferably extend continuously from one prominence to the other. Most preferably they extend beyond the prominences, on the opposite side of each prominence from the hollow 13. Preferably one or more of the tensioning fibres extend across the shortest path between the prominences. The tensioning fibres are preferably substantially inextensible. That may allow them to apply tension to the preform. The tensioning fibres may be substantially inextensible relative to the diaphragms; that is the tensioning fibres may have less elastic extension for a given load than a region of both diaphragms having the same area as the tensioning fibres occupy in the plane of the diaphragms.

Irrespective of the shape of the former 113 and of whether a tensioning layer 51/54 is included in the preform, the diaphragms 104, 105 may advantageously be formed of material that provides good conformity of the precursor to the former. In some circumstances this may be promoted by the diaphragms being of dissimilar sheets. For example, it can be advantageous for the closer diaphragm 105, which contacts the former 113 to be of thinner sheet than the further diaphragm 104. A relatively thin closer diaphragm 105 can allow the precursor to be located relatively close to the former 113, whilst a thicker further diaphragm 104 may provide better durability and may help to consolidate the precursor firmly against the former once both vacuums are drawn. The thickness of the closer diaphragm may, for example, be less than 2.0 mm or less than 1.5 mm or less than 1.0 mm or less than 0.7 mm. The thickness of the further diaphragm may, for example, be more than 0.7 mm or more than 1.0 mm or more than 1.5 mm or more than 2.0 mm. The thickness of the diaphragms is preferably measured in the absence of a precursor and when no vacuum is applied.

Each diaphragm may be of uniform or non-uniform thickness. If the diaphragm is of non-uniform thickness, the effective thickness of the diaphragm may be taken to be its mean thickness.

The diaphragms may be of the same or different compositions. It is preferred that both diaphragms are elastically extensible. Both diaphragms may be elastomeric sheets, for example rubber or silicone sheets. Both diaphragms may be of material having a Young's modulus less than, for example, 10 MPa or less than 6 MPa or less than 3 MPa.

The or each vacuum may be drawn to an absolute pressure of, for example, 200 mb or less, or 100 mb or less, or 50 mb or less. The diaphragm closer to the former may be more elastic than the other diaphragm: i.e. it may be deform more for a given load.

The apparatus of FIG. 2 may be installed in any orientation. For example, the operating direction 120 could be vertical, horizontal or inclined. The former 113 could be below, above or offset horizontally from the diaphragms.

In the example of FIG. 4 the hollow is in the form of a saddle. As a result the prominences are disconnected from each other. The hollow could be in the form of a bowl, in which case there could be a continuous prominent rim and the prominences across which the precursor is tensioned could be opposite portions of that rim.

In the example of FIG. 5, the closer diaphragm is first moved into contact with the former by motion of the frames. Then it is drawn into full conformity with the former by drawing a vacuum between it and the former. In another example, the volume between the closer diaphragm and the bed 100 may be airtight even when the closer diaphragm is spaced from the former 113. This may be achieved by the presence of airtight walls extending from the bed to frame 103 when frame 103 is in the position shown in FIG. 5b. Then the closer diaphragm may be pulled into contact with the former by drawing a vacuum in that volume.

Once the precursor has been set in shape as described above, it can be used in a subsequent forming process. For example, it can be located in a mould, impregnated with resin and the resin cured. The fibres of the precursor can then reinforce the resin. The subsequent forming process may be a resin transfer moulding process. The resin may be impregnated into the shaped precursor under a vacuum.

A single vacuum pump could be provided, and it could be connected by a valve to either outlet 117, 118.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A method of forming a fibre article, comprising:
   providing a former having a contoured forming surface;
   locating a fibre preform between a first diaphragm and a second diaphragm, the second diaphragm being offset from the forming surface;
   drawing a vacuum between the first and second diaphragms so as to hold the preform captive between the diaphragms;
   displacing the second diaphragm towards the former so as to bring the second diaphragm into partial contact with the former;
   drawing a vacuum between the second diaphragm and the former so as to bring at least a part of the second diaphragm adjoining the preform into conformity with the forming surface; and
   setting the preform in its configuration;
   wherein:
   the fibre preform comprises one or more substantially inextensible fibres extending linearly in a first direction, and a first sheet of fibre material, the fibres of the first sheet being offset from the first direction by at least 30°, the said substantially inextensible fibres being laminated to the first sheet, and the said substantially inextensible fibres extend in the first direction beyond the boundary of the first sheet;
   the forming surface comprises a concavity and prominences on either side of the concavity; and
   the step of bringing the second diaphragm into partial contact with the former comprises bringing the second diaphragm into contact with the prominences whilst the second diaphragm does not fully contact the concavity and with the substantially inextensible fibres extending from one of the prominences to the other.

2. A method as claimed in claim 1, wherein the fibre preform comprises a second sheet of fibre material, the fibres of the second sheet being offset from the first direction by at least 30° and the said substantially inextensible fibres being laminated to the second sheet and being located between the first sheet and the second sheet.

3. A method as claimed in claim 2, wherein the said substantially inextensible fibres extend in the first direction beyond the boundary of the second sheet.

4. A method as claimed in claim 3, wherein the said inextensible fibres are comprised in a sheet of fibre material.

5. A method as claimed in claim 2, wherein the diaphragms are elastic.

6. A method as claimed in claim 5, wherein the step of bringing the second diaphragm into partial contact with the former comprises, after bringing the second diaphragm into contact with the prominences whilst the second diaphragm does not fully contact the concavity, stretching the diaphragm over the prominences so as to cause the substantially inextensible fibres to apply tension to a portion of the preform extending across the concavity.

7. A method as claimed in claim 2, wherein the said inextensible fibres are comprised in a sheet of fibre material.

8. A method as claimed in claim 1, wherein the said inextensible fibres are comprised in a sheet of fibre material.

9. A method as claimed in claim 1, wherein the or each sheet of fibre material is a sheet of woven fibre material.

10. A method as claimed in claim 1, wherein the diaphragms are elastic.

11. A method as claimed in claim 10, wherein the step of bringing the second diaphragm into partial contact with the former comprises, after bringing the second diaphragm into contact with the prominences whilst the second diaphragm does not fully contact the concavity, stretching the diaphragm over the prominences so as to cause the substantially inextensible fibres to apply tension to a portion of the preform extending across the concavity.

* * * * *